Patented Sept. 25, 1928.

1,685,214

UNITED STATES PATENT OFFICE.

THOMAS M. CRAMER, OF LONG BEACH, CALIFORNIA, ASSIGNOR TO PACIFIC COAST BORAX COMPANY, A CORPORATION OF NEVADA.

PRODUCTION OF COMMERCIAL BORAX FROM RASORITE BY A WET METHOD.

No Drawing.    Application filed January 22, 1927. Serial No. 162,941.

Although my present invention, like that described in a companion case, Serial No. 160,778, filed January 12, 1927, is entitled as referring to the production of borax, it should be understood not only that the product aimed at is the ordinary "prismatic" borax $Na_2O.\ 2B_2O_3.\ 10H_2O$, but that my present invention relates more particularly to a "wet" method of producing, from the mentioned newly discovered and very slowly dissolving sodium borate (containing four molecules of water in combination) a borax solution from which the ordinary prismatic borax or other borates may be obtained, and that the process herein described may be regarded as an improvement upon that set forth in the mentioned companion case,— in that it obviates one operation and may also effect important savings in heating of the mentioned new borax mineral, as well as in time, in space requirements, in mechanical equipment and in fuel.

It is an object of my present invention to provide a highly efficient method of producing a borax solution from a borate containing less than five molecular proportions of water to two molecular proportions of $B_2O_3$; and it is a particular object of my invention to provide a method for quickly and economically obtaining from Rasorite (typically containing four molecular proportions of water to two molecular proportions of $B_2O_3$) a solution from which the prismatic borax of commerce or other borates may be obtained in any usual or preferred manner.

As mentioned in the copending case above referred to, the recently-discovered Rasorite has appeared unsuitable for economic utilization, by reason of the fact that, although capable of ultimately dissolving in water up to a known point of saturation, this new borate enters into solution, when treated with water at 212° F. or therebelow, at an exceedingly slow rate; and even fine grinding at considerable expense, has not satisfactorily accelerated the rate of solution.

I now find, however, that if, instead of relying upon a separate step of dry heating, I employ a simultaneous application of heat and water, as may be effected by the attainment of a pressure amounting to (say) 30 pounds in a body of water or mother liquor by the introduction of live steam thereto, simultaneously with or subsequently to the introduction of a stream or batch of the Rasorite, this results in a comparatively rapid dissolving action, with a correspondingly prompt production of a solution from which a more quickly soluble borate, such as the prismatic borax of commerce, may be obtained in a known manner.

A most remarkable characteristic of Rasorite is the mentioned surprisingly slow rate at which even comparatively small particles thereof dissolve in water at 212° F.,—the properties of the Rasorite being, in the respect last referred to, obviously different from those of known borates of the same series,—such as the mentioned "prismatic" borax and the so-called "octohedral" borax, containing respectively ten molecular proportions and five molecular proportions of water to two molecular proportions of $B_2O_3$.

I have mentioned in my prior application above referred to, by way of illustrating the comparatively slow solubility of the new borax, that when comparable crystals of Rasorite and prismatic borax were heated to boiling temperature in water, under parallel conditions, the former required, in the case of a crystal weighing 1.0 gram, 55 minutes before complete solution was effected, whereas a crystal of prismatic borax, weighing 1.0 gram required but 30 seconds to effect its complete solution; and it is an object of my present invention not only to obviate the necessity for fine grinding, as a means of increasing the surface exposed to solvent action, but to obviate also the necessity for the exposure of Rasorite to a dry heat, or to any heat, in advance of the application of water or a mother liquid thereto.

In the practice of my invention, taking the Rasorite as it comes from the mines, or subdividing it to a moderate extent, I may either feed the same into a pressure boiler containing hot water or mother liquor by way of a conveyor pipe through which live steam is so advanced as finally to condense; or I may feed the same into a suitable digester in advance of an addition of water or a suitable mother liquor thereto; or I may deliver the same with or into a body of water or mother liquor,—in either of the latter cases providing a tight closure and applying bottom heat or introducing live steam, or otherwise establishing the indicated simultaneous conditions of temperature and pressure; and the resultant rate of solution, from a practical or commercial standpoint, may be so rapid as to render the degree of initial subdivision a matter of comparative unimportance.

Subsequently to the mentioned dissolving, any desired steps (as, mere filtration) may be employed for the separation of gangue or any objectionable impurities from the resultant solution; and crystallization of prismatic borax, if desired, may be effected by cooling in a known manner,—the strength of the solution being preferably such that no crystals appear above about 140° F.

It should be recognized that the wet method herein described has a substantial advantage over the partially dry method described in my mentioned application, in that it obviates all use of fuel for a separate preliminary heating, and in that it accordingly may obviate one separate handling of the Rasorite.

As a matter of fact, the employment of a closed vessel constitutes a very convenient means for realizing the solvent action of water upon the Rasorite at a temperature substantially above 212° F., but I should nevertheless be unwilling to be restricted to the simultaneous employment of the mentioned high temperature and pressures,—a useful effect being possibly attributable to either of these agencies, taken separately, as well as to said agencies in the indicated combinational relationship.

Although I have herein described my invention in a preferred form, it should be understood not only that various features thereof might be independently employed, but also that numerous modifications of my invention might be devised by those skilled in the arts to which this case relates,—without involving the slightest departure from the spirit and scope of my invention, as the same is indicated above and in the following claims.

I claim as my invention:

1. In the production of a commercial borax from a solution-resistant sodium borate mineral typically containing four molecular proportions of water to two molecular proportions of $B_2O_3$, a method which comprises: subjecting said mineral to the action of a form of water at a temperature substantially above 212° F.

2. In the production of a commercial borax from a solution-resistant sodium borate mineral typically containing four molecular proportions of water to two molecular proportions of $B_2O_3$, a method which comprises: subjecting the same to a pressure substantially above atmospheric, in the presence of a form of water.

3. In the production of a commercial borax from a solution-resistant sodium borate mineral typically containing four molecular proportions of water to two molecular portions of $B_2O_3$, a method which comprises: subjecting the same to a simultaneous application of pressure above atmospheric and to a form of water at a temperature above 212° F.

In testimony whereof, I have hereunto set my hand at Los Angeles, California, this 10th day of January, 1927.

THOMAS M. CRAMER.